US012812743B2

(12) United States Patent
Tsai et al.

(10) Patent No.: US 12,812,743 B2
(45) Date of Patent: Nov. 24, 2026

(54) SMART CONTROL SYSTEM FOR CEILING FAN WITH LED LIGHTING

(71) Applicant: AIR COOL INDUSTRIAL CO., LTD., Taichung (TW)

(72) Inventors: Cheng-Hung Tsai, Taichung (TW); Shih-Ming Chen, Taichung (TW)

(73) Assignee: AIR COOL INDUSTRIAL CO., LTD., Taichung (TW)

( * ) Notice: Subject to any disclaimer, the term of this patent is extended or adjusted under 35 U.S.C. 154(b) by 17 days.

(21) Appl. No.: 19/291,530

(22) Filed: Aug. 5, 2025

(65) Prior Publication Data

US 2026/0333530 A1 Oct. 22, 2026

(30) Foreign Application Priority Data

Apr. 17, 2025 (CN) ........................ 202520730595.X
Jul. 21, 2025 (CN) ......................... 202510999424.1

(51) Int. Cl.
*H05B 45/10* (2020.01)
*H05B 47/185* (2020.01)

(52) U.S. Cl.
CPC ........... *H05B 45/10* (2020.01); *H05B 47/185* (2020.01)

(58) Field of Classification Search
CPC ........................ H05B 45/10–18; H05B 47/185
See application file for complete search history.

(56) References Cited

U.S. PATENT DOCUMENTS 5,872,429 A * 2/1999 Xia .................... H05B 41/3921 315/DIG. 4
10,798,796 B1 * 10/2020 El-Gayyar ........... H05B 39/044
2015/0028775 A1 * 1/2015 Zudrell-Koch ...... H05B 47/185 315/307
2017/0164435 A1 * 6/2017 Lee ........................ H05B 45/48
2017/0196062 A1 * 7/2017 Wang ..................... H05B 45/10
2019/0150240 A1 * 5/2019 Yu .......................... H05B 45/31 315/200 R
2022/0279641 A1 * 9/2022 Squillace ............... H05B 45/10

FOREIGN PATENT DOCUMENTS

WO WO-2021228259 A1 * 11/2021 ............. H05B 44/00

OTHER PUBLICATIONS

English machine translation of WO2021228259A1 published Nov. 18, 2021 (Year: 2021).*

* cited by examiner

*Primary Examiner* — Rexford N Barnie
*Assistant Examiner* — David A Shiao

(57) ABSTRACT

The present invention provides a smart control system for a ceiling fan with LED lighting. The device includes a mains power supply, at least one ceiling fan LED light, at least one ceiling fan motor, a wall control device, and a control driver. The wall control device includes an operation unit and is electrically connected to the mains power supply and the control driver. The control driver is electrically connected to the ceiling fan LED light and the ceiling fan motor. The wall control device supplies alternating current (AC) power and transmits AC sine wave signals to the control driver. The operation unit outputs lighting or motor control commands, which are converted by the control driver into dimming control signals using phase-cut sine wave processing. This configuration enables flicker-free dimming of the ceiling fan LED light, providing stable illumination and enhancing reliability and functionality of the overall system.

6 Claims, 8 Drawing Sheets

SMART CONTROL SYSTEM FOR CEILING FAN WITH LED LIGHTING

RELATED APPLICATIONS

The present application claims the benefit of priority to 17 Apr. 2025 Patent Application No. 202520730595.X, filed Apr. 17, 2025, and entitled "CONTROL SYSTEM FOR A DEVICE," and claims the benefit of priority to 21 Jul. 2025 Patent Application No. 202510999424.1, filed 21 Jul. 2025, and entitled "SMART CONTROL SYSTEM FOR CEILING FAN WITH LED LIGHTING," the entire contents of each of which are incorporated herein by reference.

FIELD OF INVENTION

The present invention relates to a smart control system configured for a ceiling fan with LED lighting. More particularly, the present invention pertains to a control system applicable to the technical field of ceiling fans integrated with LED lighting systems.

BACKGROUND OF THE INVENTION

With the continuous advancement of consumer electronics and household automation, a growing number of household appliances have become increasingly diverse and frequently utilized. Among such appliances, ceiling fan lighting systems are commonly encountered. A conventional ceiling fan lighting system typically includes a motor assembly, an LED lighting unit, a driver circuit, and an operation switch. The driver circuit is configured with a microprocessor chip, and the motor assembly is electrically connected to the operation switch via the driver circuit. In such conventional systems, the operation switch manipulates the alternating current (AC) sine wave supplied by the mains power line by altering the waveform angle to generate corresponding control commands for regulating the operation of the controller, as illustrated in FIGS. 5, 6A, and 6B. Specifically, the phase-cut portions between two successive negative half-cycles of the AC sine wave, in combination with multiple complete sine wave cycles, are utilized to generate a sequence of dimming control signals (t), which together form a composite dimming command (T) for modulating the light intensity in a gradual manner, such as from a bright state to a dim state, or vice versa. However, this dimming mechanism typically requires repeated actuation of the operation switch to input successive dimming commands formed by the phase-cut waveforms of the negative half-cycles. Such iterative operation results in a stepwise dimming process, during which the LED lighting unit is prone to exhibit visible flickering. This flickering not only compromises the lighting stability but also degrades the overall illumination quality. Consequently, the existing control methodology for such ceiling fan lighting systems suffers from operational inefficiencies and functional limitations, thereby necessitating structural and functional improvements.

SUMMARY OF THE INVENTION

In view of the deficiencies in functionality and operational stability associated with conventional ceiling fan lighting devices, the present invention provides a smart control system for a ceiling fan with LED lighting.

A principal objective of the present invention is to provide a smart lighting control system configured for use with a mains power supply, at least one ceiling fan LED light, and a ceiling fan motor. The smart lighting control system comprises a wall control device and a control driver. The wall control device comprises a power switch, a first power supply unit, a zero-crossing detection unit, at least one first microcontroller (MCU), an operation unit, and a sine wave phase angle control unit. The power switch is electrically connected to the mains power supply and is further connected to the first power supply unit, the zero-crossing detection unit, and the sine wave phase angle control unit. The first power supply unit and the zero-crossing detection unit are electrically connected to the first MCU. The first power supply unit is also electrically connected to the operation unit, which in turn is electrically connected to the first MCU. The first MCU is further electrically connected to the sine wave phase angle control unit. Upon activation of the power switch, alternating current (AC) power from the mains power supply is introduced to the first power supply unit and the zero-crossing detection unit. The first power supply unit converts the input AC power into direct current (DC) power for supplying the first MCU and the operation unit. The first MCU stores signal demodulation data. The operation unit stores at least one lighting control command corresponding to the ceiling fan LED light and at least one motor control command corresponding to the ceiling fan motor. The control driver comprises a second power supply unit, a sine wave phase detection unit of a power detection circuit, a LED power processing unit, a second MCU, a light driving unit, a motor power processing unit, and a motor driving unit. The second power supply unit and the sine wave phase detection unit are electrically connected to the second MCU. The LED power processing unit and the second MCU are electrically connected to the light driving unit, while the motor power processing unit and the second MCU are electrically connected to the motor driving unit. The second power supply unit, the sine wave phase detection unit, the LED power processing unit, and the motor power processing unit are each electrically connected to the sine wave phase angle control unit of the wall control device. The light driving unit is electrically connected to the ceiling fan LED light, and the motor driving unit is electrically connected to the ceiling fan motor. The sine wave phase angle control unit of the wall control device transmits AC power introduced via the power switch to the second power supply unit, the sine wave phase detection unit, the LED power processing unit, and the motor power processing unit. The second power supply unit converts the received AC power into DC power for supplying the second MCU. The second MCU stores dimming control commands. The zero-crossing detection unit of the wall control device detects the zero-crossing point of the AC sine wave and transmits the resulting signal to the first MCU. When the operation unit is long-pressed, a lighting control command is issued to the first MCU, which demodulates the received signal and transmits it to the sine wave phase angle control unit. The sine wave phase angle control unit outputs a first phase-cut sine wave signal (t1) to the sine wave phase detection unit of the control driver. The sine wave phase detection unit transmits the detected first phase-cut sine wave signal (t1) to the second MCU for command matching. The second MCU then issues a control signal to the light driving unit to initiate dimming of the ceiling fan LED light. When the long press of the operation unit is released, another lighting control command is issued to the first MCU. The first MCU demodulates the received signal and transmits it to the sine wave phase angle control unit, which outputs a second phase-cut sine wave signal (t2) to the sine wave phase detection unit. The sine wave phase detection unit transmits the detected second phase-cut sine wave signal (t2) to the second MCU for command matching. The second MCU then issues a control signal to the light driving unit to terminate the dimming operation of the ceiling fan LED light.

In a preferred embodiment, when the power switch of the wall control device is turned on, AC power from the mains power supply is introduced into the zero-crossing detection unit as a fully conductive sine wave signal. In conjunction with a lighting control command input through the operation unit, the control driver generates a control signal to regulate the ceiling fan LED light, thereby enabling simple and stable setup and operation, and enhancing the versatility of the system.

In another preferred embodiment, the zero-crossing detection unit detects the fully conductive sine wave signal and transmits the signal to the first MCU. Simultaneously, the operation unit outputs a lighting control command corresponding to a positive or negative half-cycle phase-cut waveform to the first MCU. The first MCU demodulates the received signal and transmits it to the sine wave phase angle control unit, which outputs either the first phase-cut sine wave signal (t1) or the second phase-cut sine wave signal (t2) to the control driver for generating a corresponding control signal. This configuration prevents flickering during dimming and enhances the system's stability and functional utility.

In another preferred embodiment, the first phase-cut sine wave signal (t1) and the second phase-cut sine wave signal (t2) output by the sine wave phase angle control unit may each comprise one or more groups of phase-cut sine waveforms. These waveforms may include positive half-cycle phase cuts, negative half-cycle phase cuts, or combinations thereof, thereby increasing configuration flexibility and operational diversity.

In another preferred embodiment, continuous pressing of the operation unit generates a "start dimming" command corresponding to the first phase-cut sine wave signal (t1), which causes the ceiling fan LED light to gradually transition from a bright state to a dim state or vice versa. Releasing the continuous press generates a "stop dimming" command corresponding to the second phase-cut sine wave signal (t2), terminating the dimming process. This enables intelligent dimming control without flickering, thereby improving the usability of the device.

In yet another preferred embodiment, a plurality of ceiling fan LED lights is provided. Each of the ceiling fan LED lights is electrically connected to the light driving unit of the control driver, allowing for simultaneous and stable dimming control of multiple lighting units, and enhancing the multi-functional adaptability of the present invention.

Through the integration of the mains power supply, at least one ceiling fan LED light, the wall control device, and the control driver, wherein the wall control device includes the operation unit, and the electrical connections are established such that the mains power supply is connected to the wall control device, the wall control device is connected to the control driver, and the control driver is connected to the ceiling fan LED light, AC power is introduced into the wall control device and output as a fully conductive sine wave signal. The wall control device demodulates the phase-cut signal of the lighting control command input by the operation unit and transmits a corresponding phase-cut sine wave signal to the control driver. The control driver converts the received phase-cut signal into a control signal for dimming the ceiling fan LED light. By virtue of the coordinated operation between the wall control device and the control driver, the dimming process is free from flickering, thereby ensuring stable illumination and achieving superior application stability and functionality.

DETAILED DESCRIPTION OF THE PREFERRED EMBODIMENTS

To facilitate a comprehensive understanding of the structural configuration, operational features, and technical advantages of the present invention, preferred embodiments are described in detail below with reference to the accompanying drawings. It should be noted, however, that these embodiments are provided for illustrative purposes only and are not intended to limit the scope of the present invention.

Figure 1:
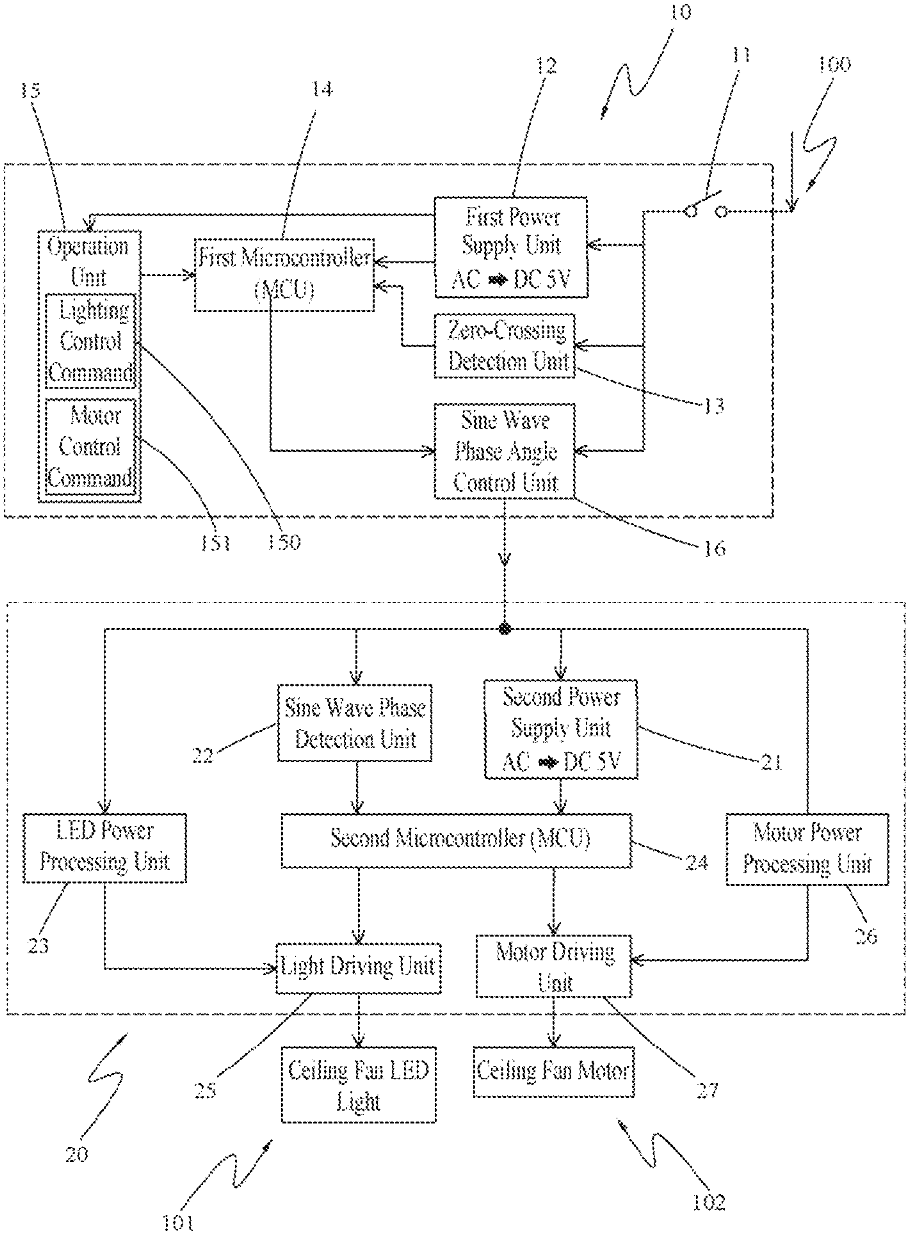
FIG. 1 is a schematic diagram illustrating the overall system configuration of the smart control system for a ceiling fan LED light in accordance with the present invention.
Figure 2:
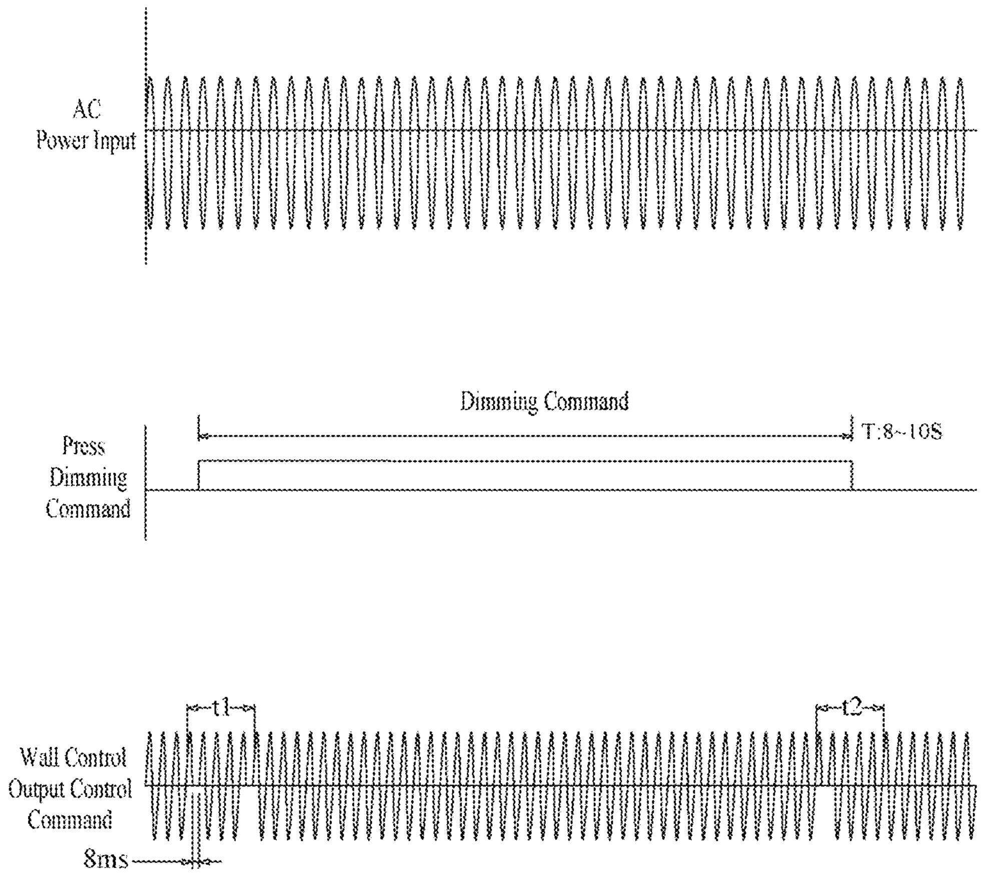
FIG. 2 is a schematic diagram illustrating a comparison between the input waveform of the mains power supply and the dimming control waveform generated by the smart control system for a ceiling fan LED light.
Figure 3A:
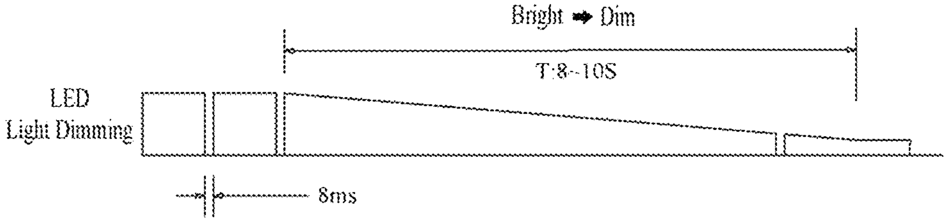
FIG. 3A is a schematic diagram illustrating the dimming signal generated by the smart control system of the present invention during a transition of the ceiling fan LED light from a bright state to a dim state.
Figure 3B:
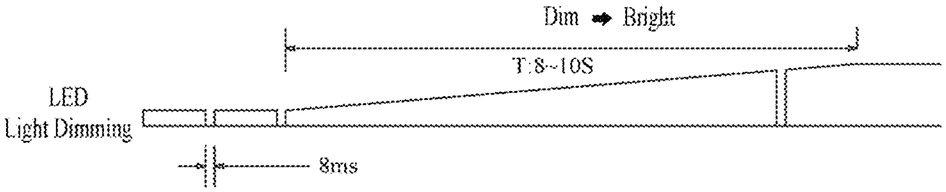
FIG. 3B is a schematic diagram illustrating the dimming signal generated by the smart control system of the present invention during a transition of the ceiling fan LED light from a dim state to a bright state.

Referring to FIGS. 1 through 2, as well as FIGS. 3A and 3B, which respectively illustrate the overall system configuration, a comparison between the input waveform of the mains power supply and the dimming control waveform, and the dimming signals during transitions from bright to dim and from dim to bright. The smart lighting control system is configured for use with a mains power supply 100, at least one ceiling fan LED light 101, and a ceiling fan motor 102. The smart control system comprises a wall control device 10 and a control driver 20.

The wall control device 10 includes a power switch 11, a first power supply unit 12, a zero-crossing detection unit 13, at least one first microcontroller (MCU) 14, an operation unit 15, and a sine wave phase angle control unit 16. The power switch 11 is electrically connected to the mains power supply 100, and further electrically connected to the first power supply unit 12, the zero-crossing detection unit 13, and the sine wave phase angle control unit 16. The first power supply unit 12 and the zero-crossing detection unit 13 are respectively connected to the first MCU 14. The first power supply unit 12 is also electrically connected to the operation unit 15, which is connected to the first MCU 14. The first MCU 14 is further electrically connected to the sine wave phase angle control unit 16. Upon actuation of the power switch 11, alternating current (AC) power from the mains power supply 100 is introduced to the first power supply unit 12 and the zero-crossing detection unit 13. The first power supply unit 12 converts the received AC power into direct current (DC) power to supply the first MCU 14 and the operation unit 15. The first MCU 14 is configured to store signal demodulation data. The operation unit 15 is configured to store at least one lighting control command 150 corresponding to the ceiling fan LED light 101 and at least one motor control command 151 corresponding to the ceiling fan motor 102.

The control driver 20 includes a second power supply unit 21, a sine wave phase detection unit 22 forming part of a power detection circuit, a LED power processing unit 23, a second MCU 24, a light driving unit 25, a motor power processing unit 26, and a motor driving unit 27. The second power supply unit 21 and the sine wave phase detection unit 22 are electrically connected to the second MCU 24. The LED power processing unit 23 and the second MCU 24 are electrically connected to the light driving unit 25. The motor power processing unit 26 and the second MCU 24 are electrically connected to the motor driving unit 27. The second power supply unit 21, the sine wave phase detection unit 22, the LED power processing unit 23, and the motor power processing unit 26 are each electrically connected to the sine wave phase angle control unit 16 of the wall control device 10. The light driving unit 25 is electrically connected to the ceiling fan LED light 101, and the motor driving unit 27 is electrically connected to the ceiling fan motor 102. The sine wave phase angle control unit 16 of the wall control device 10 delivers AC power received via the power switch 11 to the second power supply unit 21, the sine wave phase detection unit 22, the LED power processing unit 23, and the motor power processing unit 26. The second power supply unit 21 converts the received AC power into DC power and supplies it to the second MCU 24. The second MCU 24 is configured to store dimming control commands.

The smart control system is characterized in that the zero-crossing detection unit 13 of the wall control device 10 transmits the detected sine wave signal to the first MCU 14. When the operation unit 15 is long-pressed, the operation unit 15 outputs a lighting control command 150 to the first MCU 14. Upon receipt, the first MCU 14 demodulates the signal and transmits the resulting data to the sine wave phase angle control unit 16. The sine wave phase angle control unit 16 generates and outputs a first phase-cut sine wave signal (t1) to the sine wave phase detection unit 22 of the power detection circuit. The sine wave phase detection unit 22 then transmits the detected first phase-cut sine wave signal (t1) to the second MCU 24, which performs command matching with the stored lighting control command 150. Upon successful matching, the second MCU 24 generates and transmits a control signal to the light driving unit 25 to initiate dimming of the ceiling fan LED light 101. When the long press of the operation unit 15 is released, a subsequent lighting control command 150 is output to the first MCU 14. The first MCU 14 demodulates the received signal and transmits the resulting data to the sine wave phase angle control unit 16. The sine wave phase angle control unit 16 then outputs a second phase-cut sine wave signal (t2) to the sine wave phase detection unit 22. The sine wave phase detection unit 22 transmits the detected second phase-cut sine wave signal (t2) to the second MCU 24 for command matching. Upon successful matching, the second MCU 24 transmits a control signal to the light driving unit 25 to terminate the dimming operation of the ceiling fan LED light 101.

Through the coordinated interaction of the above-described components, the smart control system for a ceiling fan LED light according to the present invention is thus implemented.

Referring to FIGS. 1 through 2 and FIGS. 3A and 3B, which respectively illustrate the system configuration, the waveform differences between mains power input and dimming control, and the dimming signal transitions between bright and dim states. The smart lighting control system integrates the mains power supply 100, at least one ceiling fan LED light 101, the wall control device 10, and the control driver 20. The wall control device 10 includes the operation unit 15. The mains power supply 100 is electrically connected to the wall control device 10, which is in turn electrically connected to the control driver 20. The control driver 20 is electrically connected to the ceiling fan LED light 101. The wall control device 10 introduces AC power to generate a fully conductive sine wave signal, which is modulated using a phase-cut signal corresponding to a lighting control command input through the operation unit 15. The wall control device 10 transmits the phase-cut sine wave signal to the control driver 20, which converts the signal into a control signal for adjusting the brightness of the ceiling fan LED light 101. The cooperative operation between the wall control device 10 and the control driver 20 ensures a dimming process that is free from visible flicker, thereby delivering stable illumination and enhancing the system's reliability and functional performance.

Referring again to FIGS. 1 through 2 and FIGS. 3A and 3B, in a preferred embodiment, when the power switch 11 of the wall control device 10 is activated, AC power from the mains power supply 100 is introduced into the zero-crossing detection unit 13 of the wall control device 10 as a fully conductive sine wave signal. Upon receiving a lighting control command 150 from the operation unit 15, the control driver 20 generates a corresponding control signal to regulate the operation of the ceiling fan LED light 101. This configuration enables straightforward and stable control, thereby enhancing the multifunctional adaptability of the invention.

Referring to the same figures, in another preferred embodiment, the zero-crossing detection unit 13 detects the fully conductive sine wave signal and transmits it to the first MCU 14. Simultaneously, the operation unit 15 outputs a lighting control command 150 corresponding to either a positive or a negative half-cycle phase-cut signal to the first MCU 14. The first MCU 14 demodulates the received signal and transmits it to the sine wave phase angle control unit 16, which outputs a corresponding phase-cut sine wave signal (t1 or t2) to the control driver 20 to generate a control signal. This arrangement prevents flicker during the dimming process and enhances operational reliability.

Referring again to FIGS. 1 through 2 and FIGS. 3A and 3B, in another preferred embodiment, the phase-cut sine wave signal t1 or t2 output by the sine wave phase angle control unit 16 comprises one or more groups of phase-cut waveforms. The phase-cut waveform may be a positive half-cycle cut, a negative half-cycle cut, or a combination of both. This configuration increases the variability and customization options of the dimming control process, thereby enhancing the system's functional diversity.

Referring to FIGS. 1 through 2 and FIGS. 3A and 3B, in another preferred embodiment, continuous pressing of the operation unit 15 generates a "start dimming" signal corresponding to the first phase-cut sine wave signal (t1), which causes the ceiling fan LED light 101 to transition from a bright state to a dim state or vice versa. Releasing the continuous press generates a "stop dimming" signal corresponding to the second phase-cut sine wave signal (t2), thereby terminating the dimming action. This configuration enables intelligent dimming functionality while eliminating flicker during operation, and improves user experience.

Figure 4:
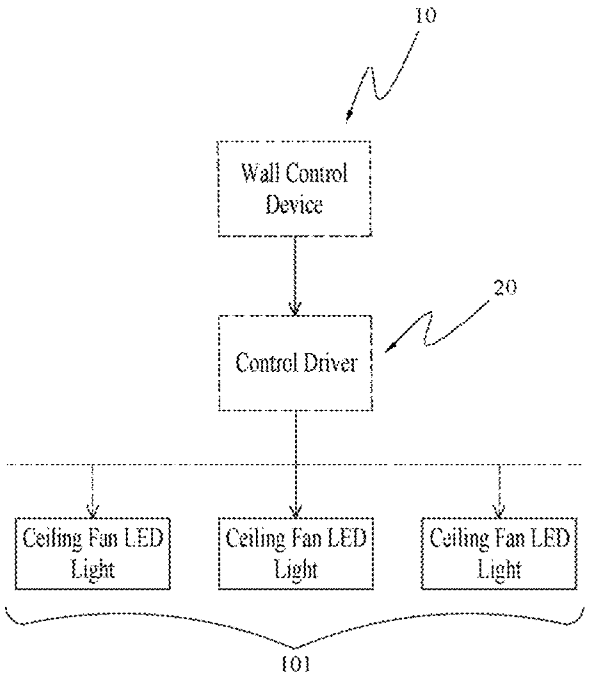
FIG. 4 is a schematic diagram illustrating a second embodiment of the smart control system for a ceiling fan LED light, in which multiple ceiling fan LED lights are electrically connected to the control driver for coordinated control.
Figure 5:
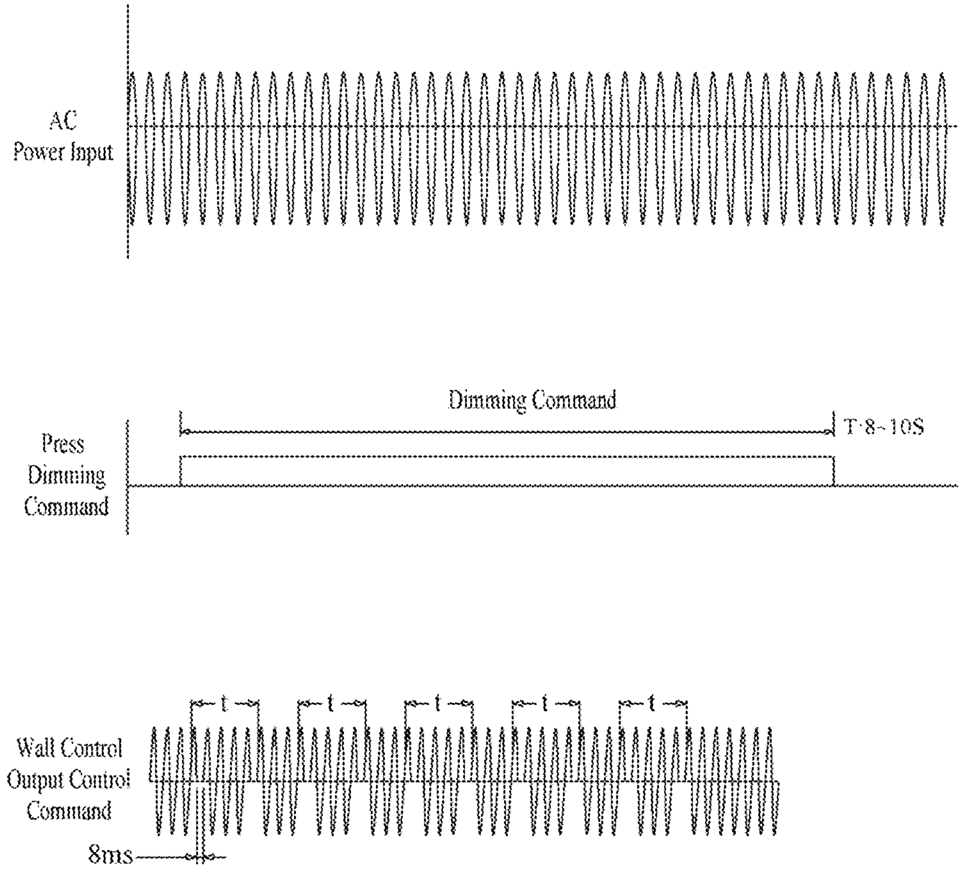
FIG. 5 is a schematic diagram illustrating the waveform differences in a conventional ceiling fan lighting device, wherein control commands are generated by altering the AC sine wave angle through the mains power lines.
Figure 6A:
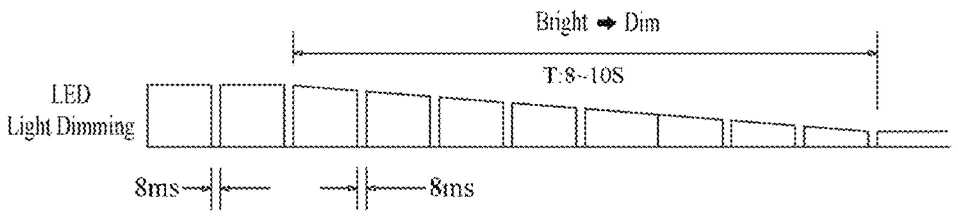
FIG. 6A is a schematic diagram illustrating the dimming signal for transitioning from bright to dim in a conventional ceiling fan lighting device utilizing phase angle modulation of the AC sine wave through the mains power lines.
Figure 6B:
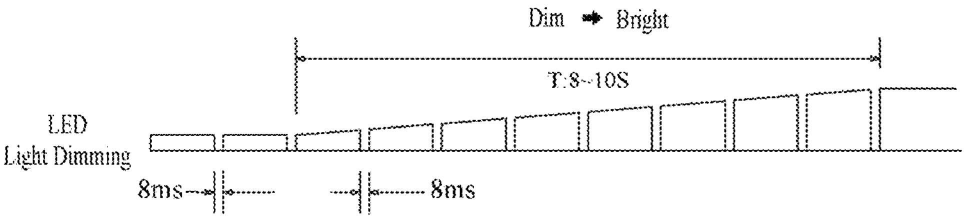
FIG. 6B is a schematic diagram illustrating the dimming signal for transitioning from dim to bright in a conventional ceiling fan lighting device utilizing phase angle modulation of the AC sine wave through the mains power lines.

Referring to FIGS. 1 and 4, in another preferred embodiment, a plurality of ceiling fan LED lights 101 is provided. Each of the ceiling fan LED lights 101 is electrically connected to the light driving unit 25 of the control driver 20. This configuration allows for simultaneous and stable dimming control of multiple ceiling fan LED lights 101, thereby enhancing the versatility and scalability of the present invention.

In summary, the present invention achieves the aforementioned technical effects and objectives, demonstrating compliance with the substantive requirements for patentability. Accordingly, the present invention is submitted for patent application.

What is claimed is:

1. A smart control system for a ceiling fan with LED lighting, configured for use with a mains power supply, at least one ceiling fan LED light, and a ceiling fan motor, the smart control system comprising:

a wall control device comprising a power switch, a first power supply unit, a zero-crossing detection unit, at least one first microcontroller (MCU), an operation unit, and a sine wave phase angle control unit, wherein:

the power switch is electrically connected to the mains power supply, the first power supply unit, the zero-crossing detection unit, and the sine wave phase angle control unit;

the first power supply unit and the zero-crossing detection unit are electrically connected to the first MCU;

the first power supply unit is electrically connected to the operation unit;

the operation unit is electrically connected to the first MCU;

the first MCU is electrically connected to the sine wave phase angle control unit;

when the power switch is turned on, alternating current (AC) power from the mains power supply is delivered to the first power supply unit for power provision and to the zero-crossing detection unit for sine wave zero-crossing detection;

the first power supply unit converts the AC power into direct current (DC) power to supply the first MCU and the operation unit;

the first MCU stores signal demodulation data;

the operation unit stores at least one lighting control command corresponding to the ceiling fan LED light and at least one motor control command corresponding to the ceiling fan motor; and a control driver comprising a second power supply unit, a sine wave phase detection unit forming part of a power detection circuit, a LED power processing unit, a second MCU, a light driving unit, a motor power processing unit, and a motor driving unit, wherein:

the second power supply unit and the sine wave phase detection unit are electrically connected to the second MCU;

the LED power processing unit and the second MCU are electrically connected to the light driving unit;

the motor power processing unit and the second MCU are electrically connected to the motor driving unit;

the second power supply unit, the sine wave phase detection unit, the LED power processing unit, and the motor power processing unit are electrically connected to the sine wave phase angle control unit of the wall control device;

the light driving unit is electrically connected to the ceiling fan LED light;

the motor driving unit is electrically connected to the ceiling fan motor;

the sine wave phase angle control unit introduces AC power received from the power switch to the second power supply unit, the sine wave phase detection unit, the LED power processing unit, and the motor power processing unit;

the second power supply unit converts the AC power into DC power to supply the second MCU, which stores dimming control commands;

wherein the zero-crossing detection unit of the wall control device transmits detected sine wave signals to the first MCU;

when the operation unit is long-pressed, the operation unit outputs a lighting control command to the first MCU, which demodulates the received signal and transmits a demodulated signal to the sine wave phase angle control unit;

the sine wave phase angle control unit outputs a first phase-cut sine wave signal to the sine wave phase detection unit;

the sine wave phase detection unit transmits the detected first phase-cut sine wave signal to the second MCU for matching with the lighting control command;

the second MCU transmits a first control signal to the light driving unit to initiate dimming of the ceiling fan LED light;

upon release of the long press, the operation unit outputs another lighting control command to the first MCU, which demodulates the signal and transmits the signal to the sine wave phase angle control unit;

the sine wave phase angle control unit outputs a second phase-cut sine wave signal to the sine wave phase detection unit;

the sine wave phase detection unit transmits the detected second phase-cut sine wave signal to the second MCU for matching with the another lighting control command; and the second MCU transmits a second control signal to the light driving unit to stop the dimming operation of the ceiling fan LED light.

2. The smart control system of claim 1, wherein the power switch of the wall control device, when activated, introduces the AC power from the mains power supply to the zero-crossing detection unit as a fully conductive sine wave signal, and in response to the lighting control command input through the operation unit, the control driver generates the control signal for performing light control functions for the ceiling fan LED light.

3. The smart control system of claim 2, wherein the zero-crossing detection unit detects the fully conductive sine wave signal and transmits the signal to the first MCU, and wherein the operation unit simultaneously outputs a positive or negative half-cycle phase-cut lighting control command to the first MCU, which demodulates the received signal and transmits the signal to the sine wave phase angle control unit, which outputs the first or second phase-cut sine wave signal to the control driver to generate the first or second control signal, thereby preventing flickering during the dimming process.

4. The smart control system of claim 3, wherein the first or second phase-cut sine wave signal output by the sine wave phase angle control unit comprises one or more groups of phase-cut sine waves, which are selected from the group consisting of positive half-cycle phase-cut signals, negative half-cycle phase-cut signals, and combinations thereof.

5. The smart control system of claim 1, wherein continuous pressing of the operation unit causes the input of a "start dimming" signal corresponding to the first phase-cut sine wave signal, which causes the ceiling fan LED light to transition from bright to dim or from dim to bright, and wherein release of the continuous press causes the input of a "stop dimming" signal corresponding to the second phase-cut sine wave signal, thereby terminating the dimming action.

6. The smart control system of claim 1, wherein a plurality of ceiling fan LED lights is provided, and wherein each of the ceiling fan LED lights is electrically connected to the light driving unit of the control driver, such that simultaneous and stable dimming control of the plurality of ceiling fan LED lights is achieved.

* * * * *